United States Patent
Jesson et al.

(10) Patent No.: US 7,746,379 B2
(45) Date of Patent: Jun. 29, 2010

(54) SENSING CARGO USING AN IMAGING DEVICE

(75) Inventors: Joseph E. Jesson, Hamilton Square, NY (US); Rick Cobello, Middlegrove, NY (US); Andrew J. Calver, Clifton Park, NY (US)

(73) Assignee: Asset Intelligence, LLC, Hackensack, NJ (US)

( * ) Notice: Subject to any disclaimer, the term of this patent is extended or adjusted under 35 U.S.C. 154(b) by 1331 days.

(21) Appl. No.: 10/335,372

(22) Filed: Dec. 31, 2002

(65) Prior Publication Data

US 2004/0125217 A1 Jul. 1, 2004

(51) Int. Cl.
*H04N 7/18* (2006.01)
*G06K 9/62* (2006.01)

(52) U.S. Cl. .................. 348/161; 348/91; 382/155; 382/224

(58) Field of Classification Search .......... 348/86, 348/91, 94, 231.3, 161; 382/141, 143, 181, 382/224, 155, 156, 157, 158, 159; 340/568.1; 702/128
See application file for complete search history.

(56) References Cited

U.S. PATENT DOCUMENTS

| | | | |
|---|---|---|---|
| 3,806,633 A * | 4/1974 | Coleman | 348/33 |
| 4,249,207 A | 2/1981 | Harman et al. | |
| 4,688,244 A | 8/1987 | Hannon et al. | |
| 4,750,197 A | 6/1988 | Denekamp et al. | |
| 4,871,252 A | 10/1989 | Beni et al. | |
| 5,050,090 A * | 9/1991 | Golub et al. | 700/217 |
| 5,093,869 A | 3/1992 | Alves et al. | |
| 5,557,254 A | 9/1996 | Johnson et al. | |
| 5,666,441 A | 9/1997 | Rao et al. | |
| 5,808,670 A | 9/1998 | Oyashiki et al. | |
| 5,953,448 A | 9/1999 | Liang | |
| 5,963,664 A | 10/1999 | Kumar et al. | |
| 6,016,368 A * | 1/2000 | Koomen | 382/291 |
| 6,154,658 A | 11/2000 | Caci | |
| 6,324,532 B1 * | 11/2001 | Spence et al. | 706/27 |
| 6,328,523 B1 * | 12/2001 | Watanabe et al. | 414/416.01 |
| 6,339,745 B1 | 1/2002 | Novik | |
| 6,366,689 B1 | 4/2002 | Rao et al. | |

(Continued)

OTHER PUBLICATIONS

Reynolds, et al; "GPS-Based Vessel Position Monitoring and Display System"; IEEE AES Magazine, Jul. 1990; pp. 16-22.

"Terion Announces New Cargo Sensor Carriers Get Real-Time Notice of Changes in Load Status"; Terion, Inc. Press Release Oct. 10, 2002. 2 pages.

Wang, et al.; "On Disparity Matching in Stereo Vision via a Neural Network Framework"; Proc. Natl. Sci. Counc. ROC(A); vol. 23, No. 5, 1999; pp. 665-678.

*Primary Examiner*—Jason Chan
*Assistant Examiner*—Nicholas G Giles
(74) *Attorney, Agent, or Firm*—Lowenstein Sandler PC (57) ABSTRACT

A camera is used to sense cargo in a cargo space. An image of at least a portion of a cargo space is captured using the camera, and a digital signal processor classifies the image as representing an empty cargo space or a non-empty cargo space. Additionally, a type of cargo represented by the captured image may also be classified by the digital signal processor and an indication of the type of cargo output.

30 Claims, 4 Drawing Sheets

U.S. PATENT DOCUMENTS

| | | |
|---|---|---|
| 6,437,702 B1 | 8/2002 | Ragland et al. |
| 6,452,487 B1 | 9/2002 | Krupinski |
| 6,459,367 B1 | 10/2002 | Green et al. |
| 6,476,812 B1 | 11/2002 | Yoshigahara et al. |
| 6,532,299 B1 | 3/2003 | Sachdeva et al. |
| 6,699,007 B2 * | 3/2004 | Huang et al. ............ 414/801 |
| 2002/0044682 A1 | 4/2002 | Weil et al. |
| 2002/0051578 A1 | 5/2002 | Imagawa et al. |
| 2002/0063744 A1 * | 5/2002 | Stephens, Jr. ............ 347/19 |
| 2002/0085747 A1 | 7/2002 | Yoshigahara et al. |
| 2002/0125435 A1 | 9/2002 | Cofer et al. |
| 2004/0233284 A1 * | 11/2004 | Lesesky et al. ............ 348/148 |

* cited by examiner

SENSING CARGO USING AN IMAGING DEVICE

TECHNICAL FIELD

The present invention is directed to cargo sensing, and more particularly to sensing cargo using an imaging device.

BACKGROUND

In today's world, a large amount of cargo is transported to and from numerous places throughout the globe on a daily basis. Oftentimes, such cargo is transported in trailers or other cargo containers that can be easily coupled to different vehicles for transport to its destination.

Monitoring the status of cargo in trailers (as well as in other cargo containers) is very important. For example, being able to know whether a particular trailer is or is not loaded with cargo is important for shipping companies and/or trailer owners. One way to know whether a particular trailer is or is not loaded with cargo is to open the door of the trailer and look inside, a manual operation. However, this can be burdensome as it requires a person to be physically located at the trailer and it can be a very time-consuming process (particularly in situations where there are large numbers of trailers being monitored). Another way to know whether a particular trailer is or is not loaded with cargo is to use an acoustic sensor to sense whether cargo is loaded in the trailer. Such acoustic sensor systems, however, are troublesome as they are typically difficult to configure and oftentimes require manual adjustments by a user during operation.

Thus, it would be beneficial to provide an improved way to monitor cargo.

SUMMARY

Sensing cargo using an imaging device is described herein.

In accordance with one aspect, an image of at least a portion of a cargo space is captured using a light sensor. The captured image is classified, using a learning classifier, as representing either the presence of cargo or the absence of cargo. An indication as to whether cargo is present in the cargo space is also output, based on the classifying.

In accordance with another aspect, a system includes a camera and a digital signal processor. The camera is to capture an image of at least a portion of a cargo space. The digital signal processor is coupled to receive the image from the camera and classify the image as representing an empty cargo space or a non-empty cargo space. In one implementation, this classifying of the image is performed using an artificial neural network.

In accordance with another aspect, an image of at least a portion of a cargo space is captured using a light sensor. A type of cargo represented by the captured image is classified, based on one or more training images. An indication of the type of cargo present in the cargo space is output, based on the classifying of the type of cargo.

BRIEF DESCRIPTION OF THE DRAWINGS

The same reference numbers are used throughout the figures to reference like components and features.

DETAILED DESCRIPTION

Sensing cargo using a camera is described herein. A camera, such as an infrared camera or ultraviolet camera, captures an image of a cargo space. A learning classifier, having been previously at least partially trained, classifies the captured image as representative of either the presence of cargo or the absence of cargo. Using this classification, an indication can be provided as to whether cargo is present or is not present in the cargo space at the time the image was captured.

Figure 1:
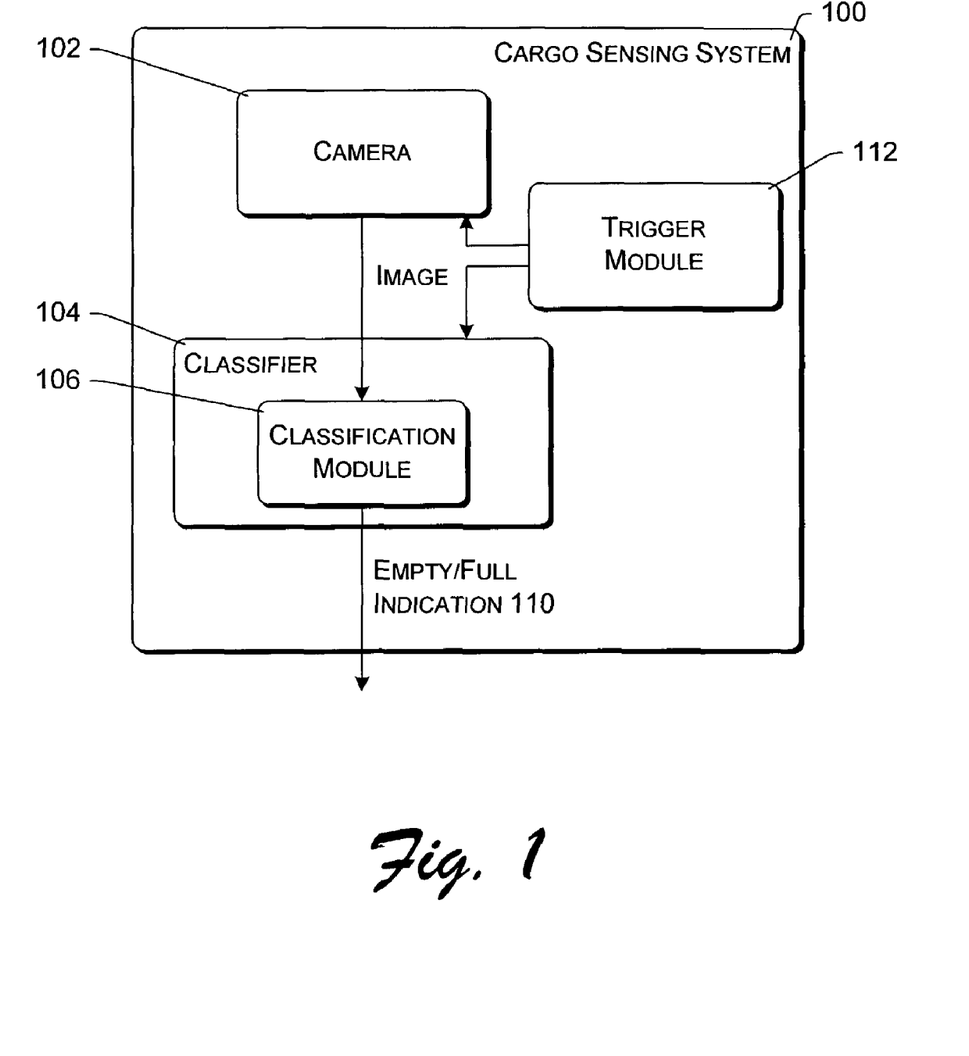
FIG. 1 is a block diagram illustrating an exemplary cargo sensing system.

FIG. 1 is a block diagram illustrating an exemplary cargo sensing system 100. Cargo sensing system 100 includes a camera 102 and a classifier 104, which in turn includes a classification module 106. During operation, camera 102 captures an image of at least a portion of a cargo space and communicates the image to classifier 104. Classification module 106 determines, based on the image received from camera 102, whether the captured image represents the presence of cargo in the cargo space or the absence of cargo in the cargo space. The cargo refers to goods or items being transported (and/or stored) in the cargo space. Classification module 106 then outputs an indication 110 of whether cargo is present in the cargo space (e.g., a "full" indication) or absent from the cargo space (e.g., an "empty" indication). The indication 110 can take a variety of different forms (e.g., it may be a single bit, with one state of the bit (e.g., zero) indicating the absence of cargo and the other state of the bit (e.g., one) indicating the presence of cargo; alternatively additional bits may also be used in indication 110).

Figure 2:
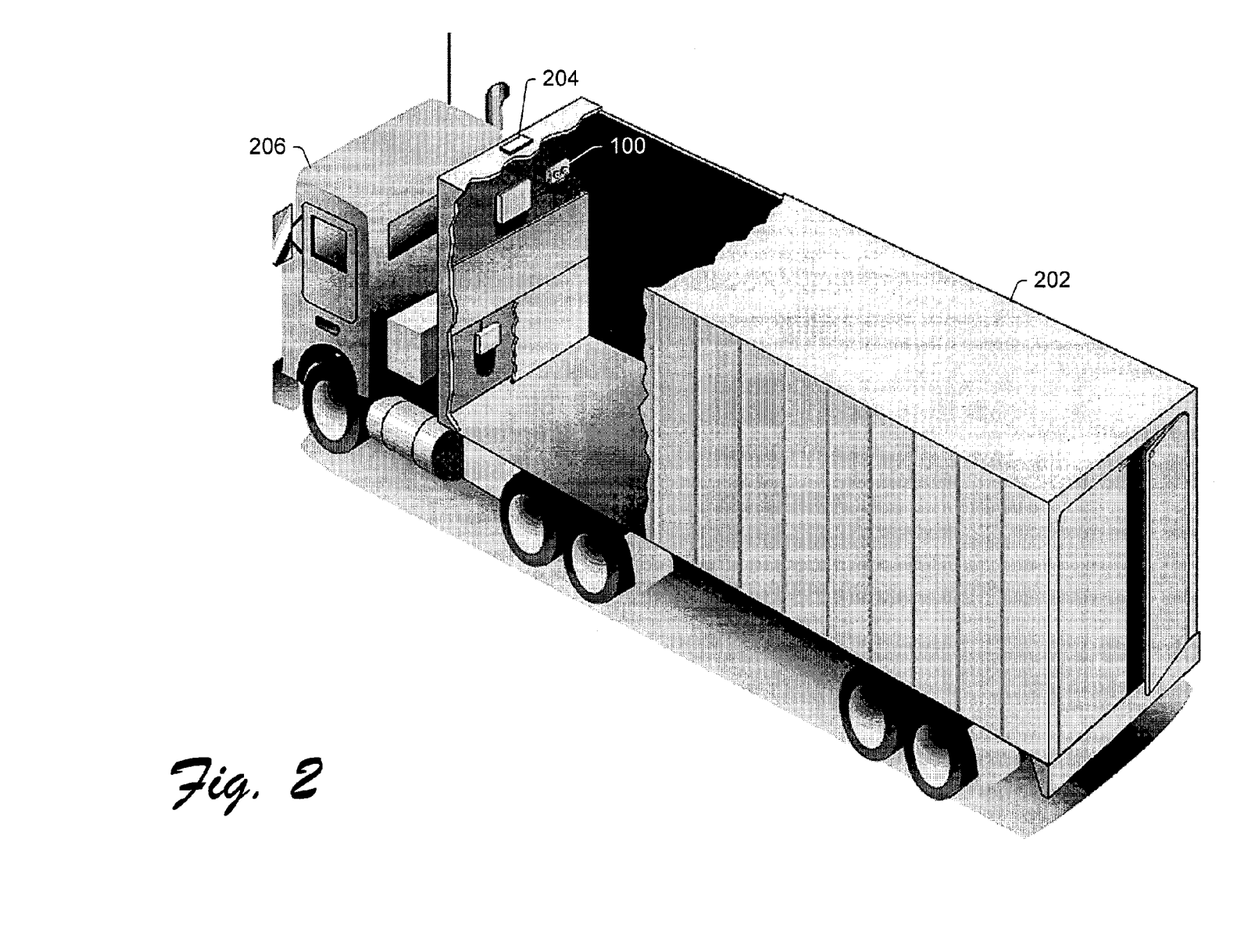
FIG. 2 illustrates an exemplary cargo space in which a cargo sensing system can be implemented.

Cargo sensing system 100 can be implemented in a variety of different cargo spaces. FIG. 2 illustrates an exemplary cargo space in which the cargo sensing system can be implemented. The cargo space illustrated in FIG. 2 is the interior of a trailer 202 having cargo sensing system 100 mounted therein. As illustrated, system 100 is mounted at the front of trailer 202 towards the top of the cargo space, although system 100 may alternatively be mounted anywhere else in trailer 202 (so long as the camera can capture an image of the cargo space).

Trailer 202 also has an antenna 204 mounted thereon to send and/or receive information from one or more remote sources (e.g., a central monitoring facility for a trucking company). Antenna 204 can allow cargo sensing system 100 to receive requests for an indication of whether cargo is present in trailer 202, and/or allow system 100 to communicate an indication(s) of whether cargo is present in trailer 202 to another component or device.

Although illustrated as coupled to a truck (also referred to as a cab or tractor) 206, trailer 202 may be removed from truck 206 and coupled to another truck. Alternatively, trailer 202 may be left alone (not coupled to any truck) for a period of time. In another alternative, trailer 202 comprises a container which can be separated from a wheel base and loaded onto a different transport vehicle (e.g., a ship or a railroad car). According to this alternative, the interior of the container is the cargo space and cargo sensing system 100 is mounted in the container.

Returning to FIG. 1, cargo sensing system 100 also includes a trigger module 112. Trigger module 112 activates the imaging device of camera 102, any illuminating sources (if needed), and classifier 104 when it is time to sense whether there is cargo in the cargo space. When triggered by module 112, camera 102 captures an image of the cargo space and communicates the image to classifier 104, which in turn determines whether there is cargo in the cargo space and outputs the appropriate indication 110. Alternatively, camera 102 may activate classifier 104 (e.g., by an additional signal (not shown) or simply by communicating the image to classifier 104) rather than trigger module 112 doing so. Additionally, in some implementations camera 102 and classifier 104 may operate continuously, and trigger module 112 may thus not be included in cargo sensing system 100.

In one implementation, trigger module 112 is responsive to an external signal (received from a component external to cargo sensing system 100) to determine when to activate camera 102 and classifier 104. For example, a signal may be received from a remote source (e.g., a central monitoring facility for a trucking company) requesting from system 100 an indication of whether cargo is currently present in the cargo space. In response to this signal received from the remote source, trigger module 112 activates camera 102 and classifier 104, and the indication 110 is returned to the remote source. Classification module 106 may be configured to return indication 110 to whatever source requested the indication (e.g., by way of antenna 204 of FIG. 2), or alternatively classification module 106 may provide indication 110 to another component or device (not shown) which is responsible for communicating the indication to whatever source requested the indication. The indication may be returned to the source as soon as the indication is generated, indications may be returned according at some regular or irregular interval, indications may be returned only when certain events occur (e.g., the indication is different than the last indication that was generated), and so forth.

Alternatively, trigger module 112 may be programmed or otherwise configured with information describing when to activate camera 102 and classifier 104. Thus, trigger module 112 can activate camera 102 and classifier 104 in the absence of any request from another component (e.g., a remote source) for an indication of whether cargo is currently present in the cargo space. Trigger module 112 may be configured to activate camera 102 and classifier 104 at regular or irregular intervals (e.g., every fifteen minutes, every two hours, every day at 8:00 am every day at 6:00 pm, every Wednesday at noon, combinations thereof, etc.) or whenever particular events occur (e.g., a motion sensor (not shown) senses that the cargo space has begun moving or stopped moving, a sensor (not shown) indicating that a door to the cargo space has been opened or closed, etc.).

Camera 102 is an imaging device that senses light in a particular frequency range(s), such as in the infrared (IR) spectrum (e.g., light wavelengths ranging between approximately 700 nm (nanometers) and approximately 1,000,000 nm) or ultraviolet (UV) spectrum (e.g., light wavelengths ranging between approximately 10 nm to approximately 400 nm). A camera 102 that senses light in the IR spectrum is also referred to as an IR camera or IR imaging device. Similarly, a camera 102 that senses light in the UV spectrum is also referred to as a UV camera or UV imaging device. Imaging devices can be implemented in different manners. Examples of imaging devices include a charge coupled device (CCD) sensor and a complementary metal-oxide semiconductor (CMOS) sensor, although other types of imaging devices may also be used.

Camera 102 may capture an image of all of a cargo space or alternatively capture an image of only a portion of the cargo space. If an image of only a portion of the cargo space is captured, then care should be taken in the placement of camera 102 in the cargo space (and/or the placement of cargo in the cargo space) so that when cargo is placed in the cargo space it is within the field of view of camera 102. In one implementation, camera 102 has a field of view of less than 180 degrees, so that if camera 102 is placed as illustrated in FIG. 2, cargo that is placed right up against the front of trailer 202 (along the same side as camera 102 is mounted) may not be within the field of view of camera 102 (depending at least in part on the size of the cargo).

Camera 102 is described herein primarily as a single imaging device. However, it should be noted that camera 102 may comprise multiple imaging devices, each of which captures an image of the cargo space. These individual images may be combined into a single image (e.g., by camera 102 or by classifier 104) before being processed by classification module 106, so that classification module 106 classifies the single combined image rather than each of the individual images separately. Alternatively classification module 106 may classify each of the individual images separately and then base its final decision on the classifications of the individual images. For example, if at least one of the individual images is classified as representing the presence of cargo, then indication 110 is that cargo is present in the cargo space; whereas if no individual images are classified as representing the presence of cargo, then indication 110 is that cargo is not present in the cargo space.

It should also be noted that when multiple imaging devices are used, each may sense light in the same frequency range(s), or alternatively different range(s). For example, one image sensor may sense light in the IR spectrum while another image sensor may sense light in the UV spectrum. Each of the images sensed in these different spectrums would then be classified and classification module 106 would base its final decision on the classifications of the individual images (e.g., if at least one of the IR and UV images is classified as representing the presence of cargo, then indication 110 is that cargo is present in the cargo space). Alternatively, a single light sensor may be able to sense light in multiple different frequency ranges (e.g., both the IR and UV spectrums). An individual image could be captured by the single sensor in each of these multiple frequency ranges, and classification module 106 would classify each individual image and base its final decision on the classifications of the individual images (e.g., if at least one of the individual images is classified as representing the presence of cargo, then indication 110 is that cargo is present in the cargo space).

It should also be noted that camera 102 may be mounted in a moveable manner so that two or more images can be captured of different (possibly overlapping) portions of the cargo space. Such a moveable mount can be used, for example, to allow a camera with a narrower field of view to be used. The camera can move in any of a variety of manners (e.g., placed on a swivel mount or a rotating mount to rotate about one or more different axes). The multiple individual images thus captured can be combined into a single image before classification or classified individually as discussed above.

It should also be noted that images captured by camera 102 may be modified or processed in some manner prior to being received by classification module 106. For example, multiple images may be combined into a single image, or the captured image may be filtered in some manner.

Classification module 106 classifies images received from camera 102 as representing either the presence of cargo or the absence of cargo. Classification module 106 may perform its classification based on an entire image received from camera 102, or alternatively only a portion of an image received from camera 102 (e.g., one or more rows and/or columns of pixels at the edge of the image may not be used for classification).

Classification module 106 implements a learning classifier that is an artificial neural network. Classification module 106 is "trained" by being presented with one or more training images that represent a cargo space with cargo in it (the presence of cargo), and one or more training images that represent a cargo space without cargo in it (the absence of cargo). Classification module 106 is also informed of which of the training images represent the presence of cargo and which represent the absence of cargo. The training images will typically include multiple different cargo spaces (e.g., multiple different sizes of cargo spaces) under different conditions (e.g., daytime, nighttime, various temperature ranges, and so forth). The training may be performed at least once per cargo space (e.g., at the time the cargo sensing system 100 is installed in the cargo space), or alternatively a classification module may be trained once and replicated for multiple cargo sensing systems 100.

Classification module 106 extracts characteristics or features from the training images that represent the presence of cargo and also extracts characteristics or features from the training images that represent the absence of cargo. Classification module 106 then uses these extracted characteristics or features to modify itself based on which characteristics or features represent the presence of cargo and which represent the absence of cargo. Thus, it can be seen that classification module 106 uses various training images to learn the characteristics or features of images that represent the presence of cargo as well as the characteristics or features of images that represent the absence of cargo.

During operation, when classification module 106 is classifying an image captured by camera 102, classification module 106 extracts the characteristics or features from the captured image and compares them to the characteristics or features of images that represent the presence of cargo as well as the characteristics or features of images that represent the absence of cargo. Classification module 106 then classifies the captured image as representing the presence of cargo if the characteristics or features of the captured image are closer to those characteristics or features of training images that represent the presence of cargo than to those characteristics or features of training images the represent the absence of cargo, and otherwise classifies the captured image as representing the absence of cargo.

A variety of different characteristics or features can be used by classification module 106. In one implementation, an image feature enhancement process is used to generate an enhanced data pattern that serves as the characteristics or features used by classification module 106. In one implementation, the image feature enhancement process is a Fast Fourier Transform (FFT) process or a statistical edge enhancement process (such as any of the well-known Sobel, Kirsch, Frei & Chen, Canny, etc. edge detectors).

Any of a variety of different types of artificial neural networks can be implemented by classification module 106. Examples of such artificial neural networks are: a back-propagation of errors artificial neural network, a self-organizing Kohonen neural network, a relaxed-energy self-organizing artificial neural network, and so forth. In one implementation, the neural network implemented by classification module 106 is a back-propagation, one hidden layer, supervised learning, digital signal processing-based library.

Classification module 106 classifies received images as representing either the presence of cargo or the absence of cargo. Another way of saying this is that classification module 106 classifies received images as representing an empty cargo space or a non-empty cargo space. The absence of cargo refers to there being no cargo in the cargo space—it does not require that the cargo space be completely devoid of all objects or items. For example, pieces of paper, cardboard, packaging materials, blankets or other protective items, buckles and/or straps, empty pallets, and so forth may be in an empty cargo space. In other words, an image where one or more of such items were present would not necessarily be classified as an image representing the presence of cargo.

Whether such items are to be considered as cargo or not can be learned by classification module 106 using appropriate training images. For example, training images including packaging materials and empty pallets in various locations within the cargo space can be submitted to classification module 106 along with an indication that such images represent the absence of cargo. By so training classification module 106, during operation images captured by camera 102 that include such packaging materials and empty pallets will typically not be classified as representing the presence of cargo.

In addition to detecting the presence or absence of cargo in a cargo space, cargo sensing system 100 can also be used to sense a type of cargo that is present in the cargo space. Analogous to the discussion above regarding detecting the presence or absence of cargo in a cargo space, training images of different types of content may also be supplied to classification module 106. Detecting different types of content allows classification module 106 to, for example: generate an indication of approximately how full a cargo space is (e.g., completely full, three quarters full, half full, one quarter full, or empty); differentiate between cargo on pallets and cargo in drums (or barrels); differentiate between cargo in boxes and cargo in drums (or barrels); and so forth.

In one implementation, classification module 106 is implemented in a single digital signal processor (DSP) integrated circuit (IC). This single IC may be mounted in the same housing as camera 102, or alternatively a different housing. Alternatively, classification module 106 may be implemented in multiple ICs.

Thus, it can be seen that the cargo sensing system described herein provides a robust and easy-to-use system for sensing cargo. Configuration of the system is easy for the user as all he or she needs to do is supply the system with training images (which can also be done by the manufacturer or supplier, alleviating the end user of the burden of training the system). As the system is a learning system, the need for continued adjustments by the user during operation is reduced.

Figure 3:
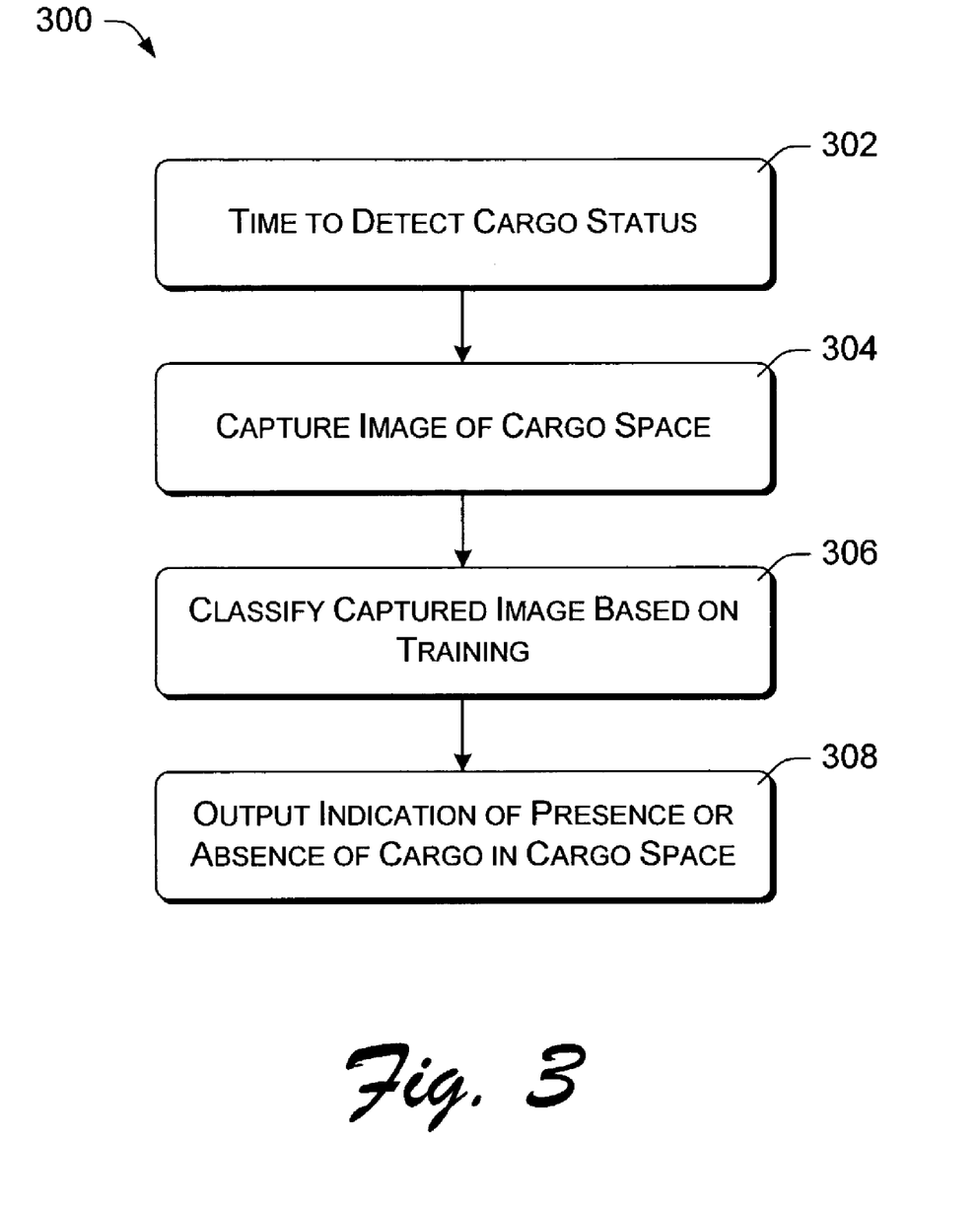
FIG. 3 is a flowchart illustrating an exemplary process for sensing cargo using a camera.

FIG. 3 is a flowchart illustrating an exemplary process 300 for sensing cargo using a camera. Process 300 can be implemented in hardware, software, firmware, or a combination thereof. In one implementation, process 300 is implemented by cargo sensing system 100 of FIG. 1.

Process 300 begins when it is time to detect the status of cargo in a cargo space (act 302). As discussed above, the determination of when it is time to detect the status of cargo in a cargo space can be based on an internal determination or an indication received from an external source. When it is time to detect the status of cargo in the cargo space, an image of the cargo space is captured (act 304). This capturing may optionally include illuminating the cargo space using one or more illuminating sources. The exact nature of such illuminating sources can vary (e.g., based on the type of imaging device, based on the frequency range(s) of light being sensed, etc.). The captured image is then classified based on the training of the classifier (act 306), such as the training images discussed above. An indication of whether cargo is present or absent in the cargo space is then output (act 308).

Process 300 is described with reference to outputting an indication as to the presence or absence of cargo in a cargo space. Process 300 may alternatively be used in an analogous manner to output an indication of different types of cargo.

Figure 4:
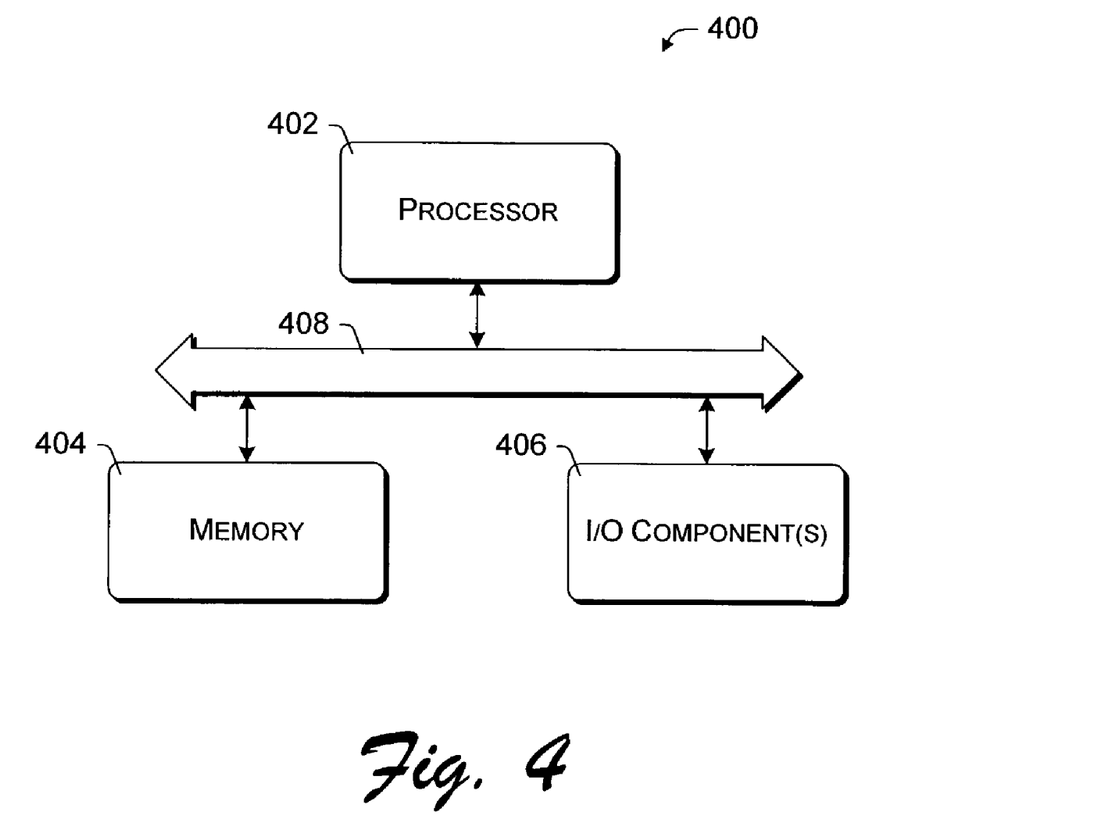
FIG. 4 illustrates an exemplary computing system that may be used to implement at least a portion of a cargo sensing system.

FIG. 4 illustrates an exemplary computing system 400 that may be used to implement at least a portion of a cargo sensing system (e.g., system 100 of FIG. 1). Computing system 400 includes a processor 402, memory 404, and one or more I/O component(s) 406 coupled together via a bus 408. Processor 402 can be one or more of any of a variety of central processing units or controllers that are capable of processing instructions. Memory 404 can be volatile and/or non-volatile memory, such as random access memory (RAM), read only memory (ROM), flash memory, magnetic or optical drives, and so forth. During operation, instructions stored in memory 404 are copied into processor 402 for execution by processor 402 in order to carry out the desired functionality of system 400.

I/O components 406 represent one or more components to receive and/or output information from and/or to one or more other devices or a user(s). The information can be data or control information (e.g., a signal from a remote source requesting an indication of whether cargo is currently present in the cargo space). I/O components 406 can be local input or output components (e.g., a keypad, display screen, control button, LED, imaging device, etc.) and/or remote input or output components (e.g., using any one or more of a variety of different wireless technologies (e.g., satellite, terrestrial cellular, RF, cellular, microwave, IR, wireless personal area network, etc.)).

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   receiving a signal requesting an indication of whether cargo is present in a cargo space from a remote source;
   capturing, using a light sensor, an image of at least a portion of the cargo space;
   classifying, using a learning classifier located within the cargo space, the captured image to determine a type of content within the cargo space, wherein the type of content comprises making a determination of cargo capacity used and the manner of use; and
   outputting, to a location that is remote from the cargo space and based on the classifying, an indication of a presence and characteristics of cargo, an absence of cargo or a presence and characteristics of non-cargo items.

2. A method as recited in claim 1, wherein the cargo space comprises an interior of a trailer.

3. A method as recited in claim 1, wherein capturing the image comprises capturing the image using an infrared (IR) imaging device.

4. A method as recited in claim 1, wherein capturing the image comprises capturing the image using an ultraviolet (UV) imaging device.

5. A method as recited in claim 1, wherein the learning classifier comprises a back-propagation of errors artificial neural network.

6. A method as recited in claim 1, wherein the learning classifier comprises a self-organizing Kohonen neural network.

7. A method as recited in claim 1, wherein the learning classifier comprises a relaxed-energy self-organizing artificial neural network.

8. A method as recited in claim 1, wherein the captured image is modified prior to the classifying.

9. A method as recited in claim 1, further comprising:
   combining a plurality of captured images by one or more cameras of different or overlapping portions of the cargo space into a single image; and
   wherein the classifying comprises using the single image as the captured image.

10. A method as recited in claim 9, wherein a first image of the plurality of captured images is captured in a first light frequency range, and wherein a second image of the plurality of captured images is captured in a second light frequency range.

11. A method as recited in claim 10, wherein the first image is captured by the light sensor of a first imaging device, and wherein the second image is captured by a light sensor of a second imaging device.

12. A system comprising:
    a module to receive a signal, from a remote source, requesting an indication of whether cargo is present in a cargo space;
    a camera to capture an image of at least a portion of the cargo space; and
    a digital signal processor, coupled to receive the image from the camera, to classify the image as representing an empty cargo space or a non-empty cargo space, including:
    a classification module located within the cargo space to extract characteristics from the image and determine, based on learned characteristics from training images, a type of content within the cargo space to provide an indication of an absence of cargo, a presence and characteristics of cargo or a presence and characteristics of non-cargo items, wherein classifying the type of content comprises making a determination of cargo capacity used and manner of use.

13. A system as recited in claim 12, wherein the digital signal processor is implemented in a single integrated circuit.

14. A system as recited in claim 12, wherein the camera comprises an infrared (IR) imaging device.

15. A system as recited in claim 12, wherein the camera comprises an ultraviolet (UV) imaging device.

16. A system as recited in claim 12, wherein the digital signal processor implements a back-propagation of errors artificial neural network.

17. A system as recited in claim 12, wherein the digital signal processor implements a self-organizing Kohonen neural network.

18. A system as recited in claim 12, wherein the digital signal processor implements a relaxed-energy self-organizing artificial neural network.

19. One or more computer readable media having computer readable instructions stored thereon that, when executed by a processor, causes the processor to:
    receive a signal, from a remote source, requesting an indication of whether cargo is present in a cargo space;
    access at least a portion of an image of at least a portion of the cargo space, wherein the image was generated by sensing light at a particular frequency range;
    classify, from within the cargo space, the captured image to determine a type of content within the cargo space, wherein classifying the type of content comprises making a determination of cargo capacity used and the manner of use; and output to a location remote from the cargo space, based on the classification, an indication of a presence and characteristics of cargo, an absence of cargo or a presence and characteristics of non-cargo items.

20. One or more computer readable media as recited in claim 19, wherein the particular frequency range comprises the infrared (IR) range.

21. One or more computer readable media as recited in claim 19, wherein the particular frequency range comprises the ultraviolet (UV) range.

22. A method comprising:
capturing, using a light sensor, an image of at least a portion of a cargo space;
classifying from within the cargo space, based on one or more training images, a type of cargo represented by the captured image to determine a type of content within the cargo space, wherein the type of cargo comprises making a determination of cargo capacity used and the manner of use; and
outputting, to a location remote from the cargo space and based on the classifying, an indication of a presence and characteristics of cargo, an absence of cargo or a presence and characteristics of non-cargo items.

23. A method as recited in claim 22, wherein the light sensor comprises an infrared (IR) imaging device.

24. A method as recited in claim 22, wherein the light sensor comprises an ultraviolet (UV) imaging device.

25. A method as recited in claim 22, wherein the classifying comprises classifying the type of cargo represented by the captured image using a back-propagation of errors artificial neural network.

26. A method as recited in claim 22, wherein the classifying comprises classifying the type of cargo represented by the captured image using a self-organizing Kohonen neural network.

27. A method as recited in claim 22, wherein the classifying comprises classifying the type of cargo represented by the captured image using a relaxed-energy self-organizing artificial neural network.

28. A system comprising:
a module to receive a signal, from a remote source, requesting an indication of whether cargo is present in a cargo space;
a camera to capture an infrared (IR) or ultraviolet (UV) image of at least a portion of the cargo space; and
a digital signal processor located within the cargo space implementing a learning classifier to classify the image to determine a presence and characteristics of cargo in the cargo space, an absence of cargo in the cargo space or a presence and characteristics of non-cargo items in the cargo space by classifying a type of content within the cargo space,
wherein classifying the type of content comprises making a determination of cargo capacity used and the manner of use, and
wherein the digital signal processor is coupled to receive the image from the camera.

29. A system as recited in claim 28, wherein the learning classifier comprises a back-propagation of errors artificial neural network.

30. A system as recited in claim 28, wherein the learning classifier comprises a self-organizing Kohonen neural network.

* * * * *